United States Patent [19]

Fukuta

[11] Patent Number: 5,628,455

[45] Date of Patent: May 13, 1997

[54] METHOD AND APPARATUS FOR MODIFICATION OF SUPERCOOLED FOG

[75] Inventor: Norihiko Fukuta, Salt Lake City, Utah

[73] Assignee: The University of Utah, Salt Lake City, Utah

[21] Appl. No.: 251,631

[22] Filed: May 31, 1994

Related U.S. Application Data

[63] Continuation of Ser. No. 999,310, Dec. 31, 1992, abandoned.

[51] Int. Cl.⁶ .................................................. E01H 13/00
[52] U.S. Cl. ............................................................ 239/2.1
[58] Field of Search ...................................... 239/2.1, 14.1, 239/172

[56] References Cited

U.S. PATENT DOCUMENTS

| | | | |
|---|---|---|---|
| 558,940 | 4/1896 | Frey | 239/14.1 |
| 2,570,867 | 10/1951 | Schaefer | 239/2.1 |
| 2,908,442 | 10/1959 | Stone | 239/2.1 |
| 2,963,975 | 12/1960 | Musser | 239/14.1 X |
| 3,378,201 | 4/1968 | Glew et al. | 239/2.1 |
| 3,608,810 | 9/1971 | Kooser | 239/2.1 |

OTHER PUBLICATIONS

"Sun on Demand" and Meteorologist receives $265,000 to continue for dispersion project USA Today, Dec. 27, 1989.
"Prof Receives OK to continue fog–clearing studies, experiments". Daily Utah Chronicle, Oct. 23, 1989.
Gross, Edward "Assault on Fogs," Science News, vol. 96 (Aug. 30, 1969) pp. 165–167.

*Primary Examiner*—Andres Kashnikow
*Attorney, Agent, or Firm*—Terry M. Crellin; James L. Sonntag

[57] ABSTRACT

A method an apparatus for reducing super cooled fog which involves the introduction of liquid carbon dioxide in a horizontal line along the ground under the fog from a moving vehicle.

4 Claims, 4 Drawing Sheets

METHOD AND APPARATUS FOR MODIFICATION OF SUPERCOOLED FOG

This application is a continuation of U.S. application Ser. No. 07/999,310, filed Dec. 31, 1992, now abandoned.

FIELD OF THE INVENTION

This invention relates to an apparatus and method for seeding supercooled fog.

BACKGROUND OF THE INVENTION

A water fog (as opposed to ice fog), whose temperature is lower than 0° C., is called a "supercooled fog". The supercooled fog layer that develops in winter often accumulates pollutants and deflects the sunshine. This causes cooling which further induces problems like more home heating fuel consumption and consequently more pollution generation, air pollution accumulation, and poor visibility over the airport and highways, in addition to worsening conditions for people with respiratory problems and those with mental instabilities and illnesses. Particulate air pollutants are effective center nuclei of fog droplet formation. Due to increased size of fog droplets compared with the dry nuclei, they are more easily captured in the human lungs, making the pollutants more lethal. This problem is not well appreciated by researchers who are measuring the air pollution level.

The only known technique of weather modification that is truly proven is the clearing of supercooled fog, although there still remain a number of technical problems. Dry ice seeding has been routinely carried out at a number of airports throughout the world. Despite the fact that the method is not very scientific and efficient, with strenuous effort, it has been marginally successful in keeping airports open during fog episodes. Under awkward meteorological conditions like fast drifting dense fog, failure in clearing is common.

At temperatures below 0° C., water gives higher vapor pressure than ice. If an ice crystal appears in a supercooled fog, due to the pressure difference between them, water vapor evaporates from supercooled fog droplets and deposits onto the ice crystal surface with associated heat generation. As a result, first the ice crystal becomes larger and the fog droplets within the vicinity evaporate and disappear, and secondly the ice crystal falls out.

Cloud seeding requires introduction of a large number of ice crystals into supercooled clouds and fogs. When a supercooled fog is seeded, the ice crystals thus grow by evaporating the fog, i.e., converting a large number of small fog droplets into a fewer number of large crystals. When the crystals become large enough, they will fall out. The effect of cloud seeding to fog visibility and therefore sunshine transmission is twofold:

(1) Change from a large number of small fog droplets to a much smaller number of large crystals. For a given mass of condensate, the visibility is approximately proportional to the size.

(2) Ice crystal fallout.

When the ice crystals grow by evaporating fog droplets, the process proceeds under approximate conservation of the mass of the condensed phases, i.e., water and ice. The visibility (or sunlight penetration) is roughly proportional to the product of the number concentration of particles and the cross-sectional area which is proportional to $r^2$ where r is the particle radius. From the mass conservation, $n \propto 1/r^3$. Then, $$\text{VISIBILITY} \propto 1/(nr^2) \propto r \propto (1/n)^{1/3}. \quad (1)$$

The fall velocity, w, of ice crystals in question here obeys the so-called Stokes law, or $$w \propto r^2 \propto 1/(n)^{2/3}. \quad (2)$$

From these two relationships, it is clear that a larger size, with fewer number of crystals, is advantageous for visibility increase, instead of a smaller size with larger numbers.

Conventional Dry Ice Seeding

Referring to FIG. 1, in a conventional dry ice seeding of supercooled fog, crushed pellets are dropped from an aircraft along 101, and the generated ice crystals form a vertical curtain. In this curtain 103, the buoyant force due to the released heat of phase change is integrated vertically and becomes very strong. As a result, the plume 105 moves rapidly upward above the fog top 102 to the bottom of the inversion 104, leaving the lower level fog unaffected due to a close-in effect 107. The rapid vertical air motion cuts the time of crystal growth and that of the ice crystal plume diffusion, rendering both the ice crystal and the plume 105 size small, a distinct disadvantage of the seeding. This tends to encourage seeders to drop more dry ice over the remaining fog, which results in too many relatively small ice crystals instead of a few large ones. This is an undesirable condition for fog clearing as stated above. The many small drifting ice crystals observed during seeding operations of dry ice pellets at the airport area are a result of this type of seeding, and it is called "overseeding." For these reasons, it is clear that the current dry ice based fog seeding effect is not at its best.

It has been demonstrated that aerial distribution of liquid carbon dioxide (LC) over the top of super cooled fog is not effective in clearing the fog. Penetration of the fog, e.g. by flying through the fog, has been shown effective, but this method is not practical, particularly in built up or mountainous terrain, due to safety reasons, i.e., the danger of colliding with vertical structures and land forms. In addition, penetration flying at low altitudes in a fog bank would likely be prohibited by FAA regulations.

SUMMARY OF THE INVENTION

An embodiment of the invention is a method for the reduction of supercooled fog which comprises introducing liquid carbon dioxide into the fog from and along the ground by moving vehicles, in a quantity to diminish the supercooled fog.

Another embodiment of the invention is an apparatus for the reduction of supercooled fog which comprises;

(a) a source of liquid carbon dioxide, (b) nozzle means oriented to introduce liquid carbon dioxide into the fog, (c) a conduit means for conveying the liquid carbon dioxide from the source to the nozzle means, (d) a vehicle means for conveying the nozzle means along the ground level so as to distribute liquid carbon dioxide into the fog while moving along the ground.

A new, supercooled fog seeding method and apparatus has been found with results far exceeding those of the previously known methods. The new method is based on ground-based mobile horizontal line seeding of liquid carbon dioxide at the bottom of supercooled fog and is practically formulated by experimental knowledge on microphysics of ice nucleation and growth and its interaction with fog air dynamics.

In seeding tests, areas over 100 mi$^2$ (250 km$^2$), including populated areas of cities, airports, and accident ridden sections of highways, were frequently cleared. This was confirmed by the appearance of unique optical effects and subsequent fog dissipation. Meteorological data of cleared zones showed a dramatic increase in insolation and temperature, decrease in relative humidity, and change in wind direction from parallel to perpendicular to the mountain range. Fallen ice crystals from seeded fog created no traffic hazard as they are blown away from the road surface by car motions.

The invention may be applied to bring sunshine to the ground for warmth, home heating fuel savings or reduction of pollution generation rate, mental hygiene, pollution abatement in terms of the toxicity reduction and co-precipitation of pollutant particles, and visibility improvement at airports and on highways.

The present method is a practical method of fog seeding. Extensive tests of the ground seeding device were carried out on a semi-quantitative basis, and the results were remarkable.

The success of the new supercooled fog seeding method is based on high efficiency microphysics-dynamics interaction arising from a horizontally laid ice crystal plume at the bottom and often the upwind side of the supercooled fog and an apparatus that enabled this mode of seeding.

Nature of Supercooled Fog

The seeding tests of winter mountain valley fogs revealed that, contrary to seemingly calm outlook of the fog from a distance, the fog comprises gentle convective cells, which causes the lapse rate to be pseudoadiabatic. This ensures that additional heating of seeding due to the associated phase change drives the seeded plume upwards within the fog or the mixing zone by convection before ice crystal fallout from the widened and enlarged plume.

Efficiency of Fog Seeding

The new, horizontal mobile line seeding of LC makes use of maximum microphysics-dynamics interaction of seeding with minimum required numbers of ice crystals and therefore the maximum size ice crystals. This is advantageous to cause their fallout for better air clarity. Therefore, the new fog seeding method was proven to be extremely efficient in clearing supercooled fog, resulting in associated effects and benefits.

The seeding reaction involves initial lifting and enlarging of an ice crystal plume during which the seeder/observer loses track of it. Ice crystals soon begin to fall, and their position separates from the rising warm air created by the heat of the phase change. When the ice crystals reach the ground, an optical effect becomes visible. For this reason, the time period to witness the optical effect is relatively short, although the effect is important to confirm the artificial seeding of the fog. This ice crystal fallout and associated optical effect are followed by another period of clear space expansion due to mixing of artificial dry air space left behind the falling ice crystals with fog. At about $-10°$ C., the ice crystal growth rate, an important factor for fog droplet evaporation and clearing, shows a minimum with a fall velocity maximum. In this temperature zone, the seeding efficiency is lower. The highest efficiency occurs at about $-15°$ C., although the new method of seeding works under almost any temperature below $0°$ C.

The depth of fog is another important factor for fog clearing. At a given temperature, the fog depth determines the time period of ice crystal plume diffusion and ice crystal growth. In this regard, the deeper and the denser the fog, the better and the larger the seeding effect is.

Fog sometimes appears with the bottom lifted from the ground. Under such a condition, ground seeding is not possible. However, a new method has been devised to seed in the fog from the side of a mountain, making use of the fog drift.

DETAILED DESCRIPTION OF THE INVENTION

Figure 1:
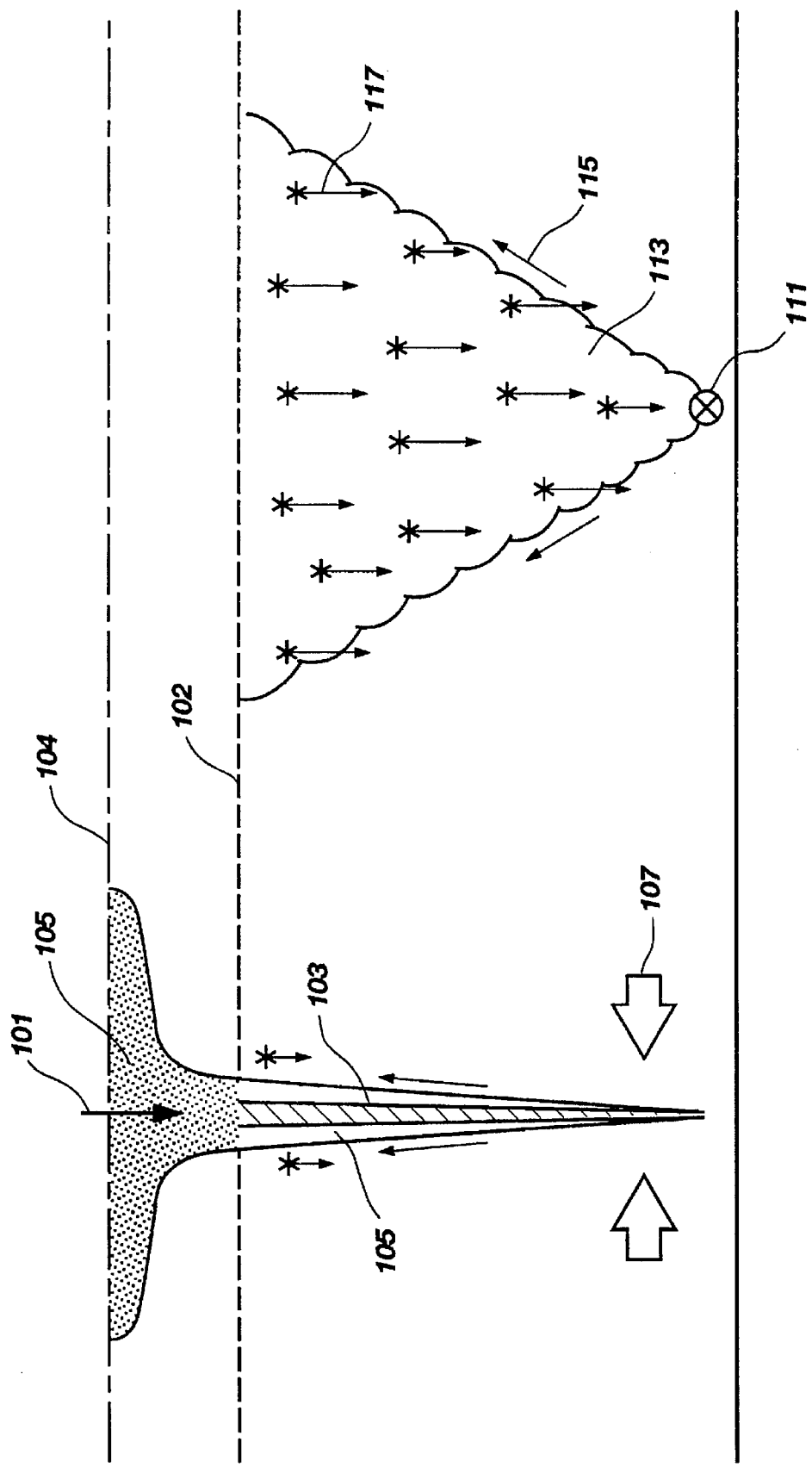
FIG. 1 is a comparison of effects between airborne dry ice seeding and horizontal ground line seeding of liquid carbon dioxide.

In order to avoid the undesirable effects of the conventional dry ice pellet dropping method of supercooled fog seeding and to obtain a better effect in a much wider area, liquid carbon dioxide (LC) is sprayed directly into the fog in a horizontal line from a moving vehicle at the bottom of the fog 111 (See FIG. 1). Ice nucleation characteristics of the sprayed LC are about the same as dry ice. This method of LC seeding avoids formation of an ice crystal plume with excessive buoyancy like a vertical ice crystal curtain. When LC is sprayed, it cools the air down to $-90°$ C. LC is a non-toxic, non-flammable, inexpensive and self-powered liquid. It is slightly cheaper than dry ice and is advantageous in storing and handling compared with dry ice. The former can be stored indefinitely, whereas dry ice has a definite time limit for storage. When handling in an aircraft, dry ice requires a bulky crusher-dispenser and proper air ventilation to avoid asphyxiation. Since LC is kept in a pressure cylinder, there is no problem of asphyxiation, and it can be discharged safely and accurately from nozzles by its own pressure. Like dry ice, LC is an instantaneous ice generator due to strong evaporative cooling. Spraying of LC out of a moving nozzle makes its ice crystal production rate high because the cold, sprayed LC droplets always meet with fresh supercooled fog due to the moving action of the seeding vehicle. Whereas, a stationary nozzle emits the LC droplets into an ice crystal plume already generated, making the efficiency of the ice crystal production rate lower. Most importantly, LC can generate ice crystals in large numbers, fight up to $0°$ C., and the number is virtually constant regardless of the fog temperature. This is in sharp contrast to a heterogeneous ice nucleant like silver iodide (AgI), the conventional cloud seeding agent whose ice nucleation rate is extremely dependent not only on temperature but on time, t, due to contact nucleation and other mechanisms.

The rate of the phase change or the seeding effect caused by the growing ice crystal in a unit volume of fog is a function of the product between the number concentration, n, and the mass growth rate, $dm/dt$, of the ice crystals, provided that ice crystals are uniformly distributed among fog droplets. For a given t after the start of growth, $dm/dt$ varies less than one order of magnitude within the range of temperature for seeding. Since the maximum liquid water content in the fog is approximately constant, a total phase change of the fog may be achieved with a constant n within a given period of time. In the seeded ice crystal plume, growing and diffusing in the eddy field from a line source has an ice crystal (diffusional) growth controlled portion, i.e., the diffusing ice crystal plume has ice crystals only in its center, without fog droplets. One can approximate this volume with a fog volume in which uniformly distributed ice crystals have just evaporated droplets due to their growth, the concentration, n, required to satisfy this condition can be estimated.

The nearly constant number of ice crystal generation by LC, regardless of the fog temperature as long as it is below 0° C., is a distinct advantage of its seeding application. The ice nucleants, whose effective number of ice crystal production depends highly on the temperature, are disadvantageous for this reason. In addition, since the fog temperature is often above −4° C., ice nucleants like AgI do not work at all. The constant number of ice crystals by the LC method eliminates the problem of adjusting the discharging rate of seeding material according to the fog temperature, which is difficult to achieve in most cases. In addition to this temperature independence of ice crystal generation, the efficiency, or the number of ice crystal generation per unit weight of LC, is probably at the theoretical maximum.

Maximization of Microphysics-dynamics Interaction in the Present Invention

Being backed up by the maximum microphysical effect of LC seeding, the present seeding method aims at formation of a horizontal line source of ice crystals 111 (See FIG. 1) from which the generated ice crystal plume 113 rises and diffuses, with a weak buoyancy in the plume.

In the atmosphere, including the fog, the eddy fields for turbulent diffusion tend to break down and die out unless they are constantly generated under the shear force. This is why the warm and stabilized ice crystal plume of dry ice seeding at the bottom of the temperature inversion is not effective in spreading. Then, it is clear that the elevated temperature of the horizontally seeded ice crystal plume provides a shear force due to its buoyancy. The plume spreading is a function of the shear (or induced eddy field) and the existing eddy field, as well as their duration. The shear depends on the fog condition in terms of the temperature and the supercooled liquid water content for the phase change, and is therefore given by the condition of the environment or the fog. Under the given condition of a supercooled fog, one can make this plume spreading larger by making the time of the duration longer by placing the line source of ice crystals at the bottom of the fog. The horizontal line source of ice crystals minimizes the vertical integration of the plume buoyant forces to avoid a rapid ascent and provides a longer period of time for the spreading (see arrow 115 in FIG. 1), with relatively small n, so that sufficiently large mass, m, will be achieved, leading to eventual and rapid ice crystal fallout 117. This process may be advantageous to weather modification for other purposes.

Design of Ground Seeding Apparatus

An embodiment of seeding apparatus comprises of the following parts, (1) LC cylinders as a liquid carbon dioxide source and a supporting rack, (2) a high pressure tube to guide LC to the nozzle system, (3) a nozzle to spray LC and a supporting system for the nozzle and tube, and (4) a vehicle so that the seeding apparatus can be conveyed in a horizontal line along the ground.

LC cylinders made of aluminum and a 50-lb. capacity are advantageous for handling due to lighter weight. The cylinders are kept in an inverted position, with the valves at the lower end so that the vapor pressure of LC, several tens atmosphere at room temperature, will permit the liquid, instead of the gas, to reach the nozzle for spraying. If the gas is allowed to generate in the system, dry ice will form and clog it. Siphoned cylinders can be used in the upright position, but the height makes them unstable in a car.

The high pressure tube can be made of reinforced rubber, but after operation, rubber tends to freeze and becomes brittle due to evaporative cooling of LC and dry ice formation. Thin metal tubing, like copper, is advantageous in this regard, but it is less flexible. It is also normally less expensive. It should be pointed out that the metal tubing should be sufficiently thin (less than 0.25 inch OD) so that LC remaining in the tube will not cause unwanted cooling when the system is shut off.

A nozzle with a hole of 0.01 inch (0.25 mm) in diameter gives LC consumption of 2 g/s (7.2 kg/h) which is often sufficient for fog seeding operation. The nozzle should be pointed towards incoming fresh supercooled fog while the seeding car is moving (upward pointing is often used), and the position should be as high as possible from the ground while staying within the legal limit.

The tube and nozzle have to be securely supported at a sufficient height. One way to do this is to assemble a pyramidal support which holds a steel rod and connects onto a ski rack.

The diameter of the nozzle depends on the desired discharge rate. Below in Tables 1a and 1b are shown LC consumption and spray rate as a function of nozzle diameter.

TABLE 1a

Nozzle Performance

| Diameter (inch) | Time (min) | LC Consumption (lb) |
| --- | --- | --- |
| 0.006 | 25 | 1 |
|  | 35 | 2 |
| 0.008 | 25 | 5 |
|  | 35 | 5 |
| 0.010 | 30 | 6 |
|  | 30 | 9 |

TABLE 1b

AVERAGE LIQUID $CO_2$ SPRAY RATE

| Nozzle Diameter (inch) | Spray Rate (g/s) |
| --- | --- |
| 0.006 | 0.37 |
| 0.008 | 1.30 |
| 0.010 | 1.89 |

Severe rusting problems with equipment have been encountered during the seeding operation, and it is recommendable to use rust resistant material for construction of the seeding device.

The means for moving the apparatus along a horizontal line at or near the ground level, is usually an automobile which can carry the LC tanks, nozzle and support racks over the terrain where the fog exists. For urban and airport areas, a conventional highway vehicle, modified to carry the LC tanks, nozzle, and racks, has been found suitable. For rougher or snowy terrain, a four-wheel drive or all-terrain vehicle may be desirable.

Figure 2:
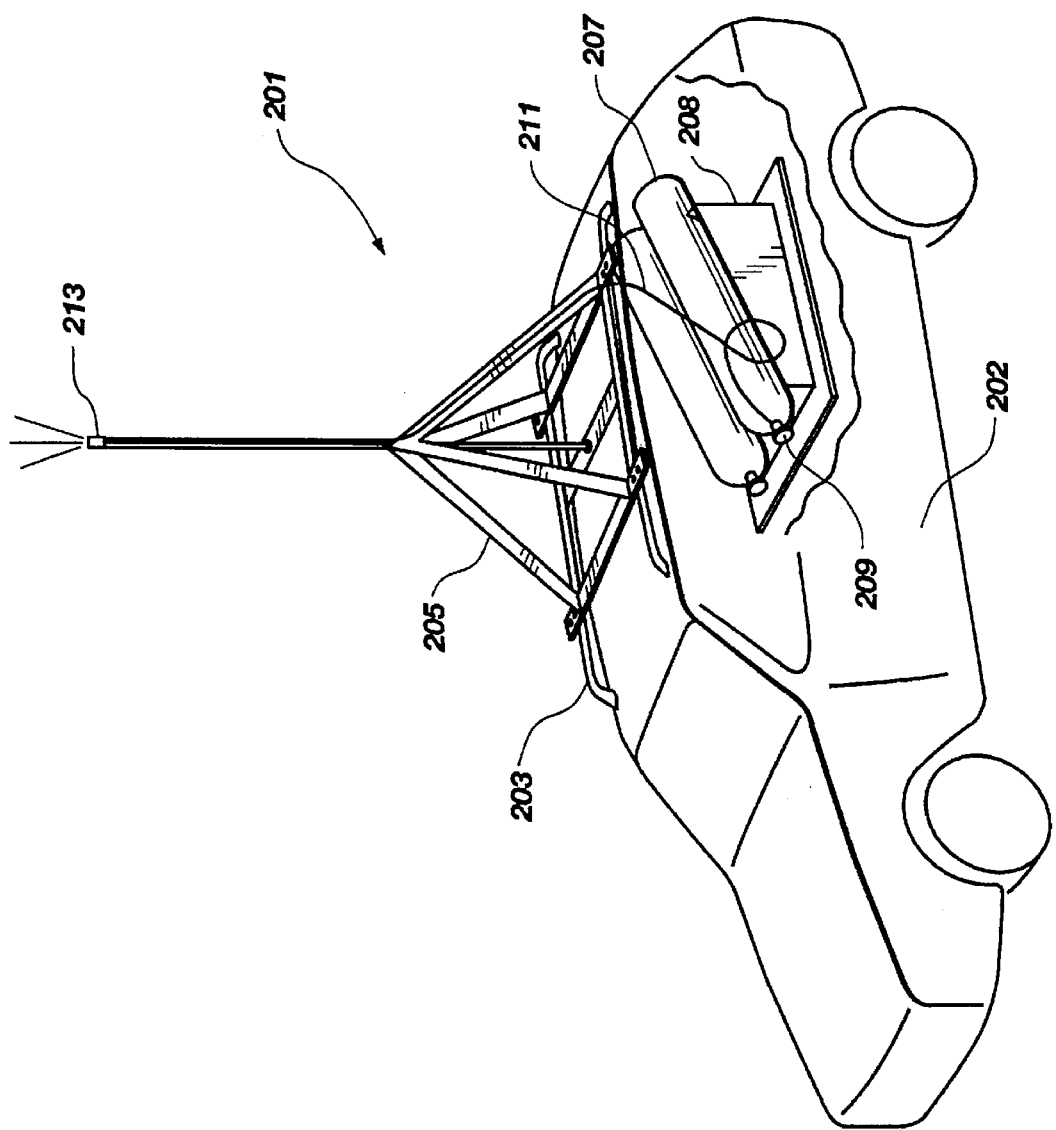
FIG. 2 is a simplified view of an apparatus of the invention.

Referring to FIG. 2, which is a simplified view of an apparatus of the invention. Apparatus of the invention 201 comprises an automobile 202 with a conventional luggage rack 203, upon which is mounted a pyramidal rack 205. LC tanks 207 are mounted on a tank rack 208 at the rear of the automobile with the tank outlets 209 at the bottom. A conduit 211 conducts LC from the tanks 207 from the tank outlets 209 to the top of the pyramidal rack 205, where a nozzle 213 is mounted. The nozzle 213 is mounted to direct LC spray upwards while the apparatus is in operation. The flow rate of the LC is regulated by the size of the nozzle.

Seeding for Sunshine, Warmth and Mental Hygiene

The present fog seeding tests clearly demonstrated that sunshine can be brought in for warmth and mental hygiene. The increase of insolation by fog seeding is dramatic in a wide area with many associated changes. Supercooled fog seeding for this purpose is now practical.

Seeding for Air Pollution Abatement

Lifting of polluted fog air by seeding appeared to enhance mainly the circulation within the fog, and net pollution lifting through the inversion layer above the fog is minimal, if any. However, drying the fog due to seeding definitely alleviates the toxicity of fog by minimizing the size of pollutant-containing particles, the capture rate by human lung, and therefore the toxic effect. This advantageous effect of fog seeding has never been pointed out before. In addition, some of the pollutant particles will fall out with the artificial snow crystals of seeding.

Seeding for Visibility Improvement

The seeding tests of fog clearly demonstrated the effectiveness of the new method in visibility improvement. Supercooled fog clearing over highways and airports is totally practical even under conditions when conventional airborne dry ice seeding fails.

The new, horizontal line seeding of LC makes use of maximum microphysics-dynamics interaction of seeding with minimum numbers of ice crystals (minimum amount of LC) and therefore the maximum size ice crystals. This is advantageous to cause their fallout for better air clarity. Therefore, the new fog seeding method was proven to be extremely efficient in clearing supercooled fog, resulting in associated effects and benefits.

Figure 3:
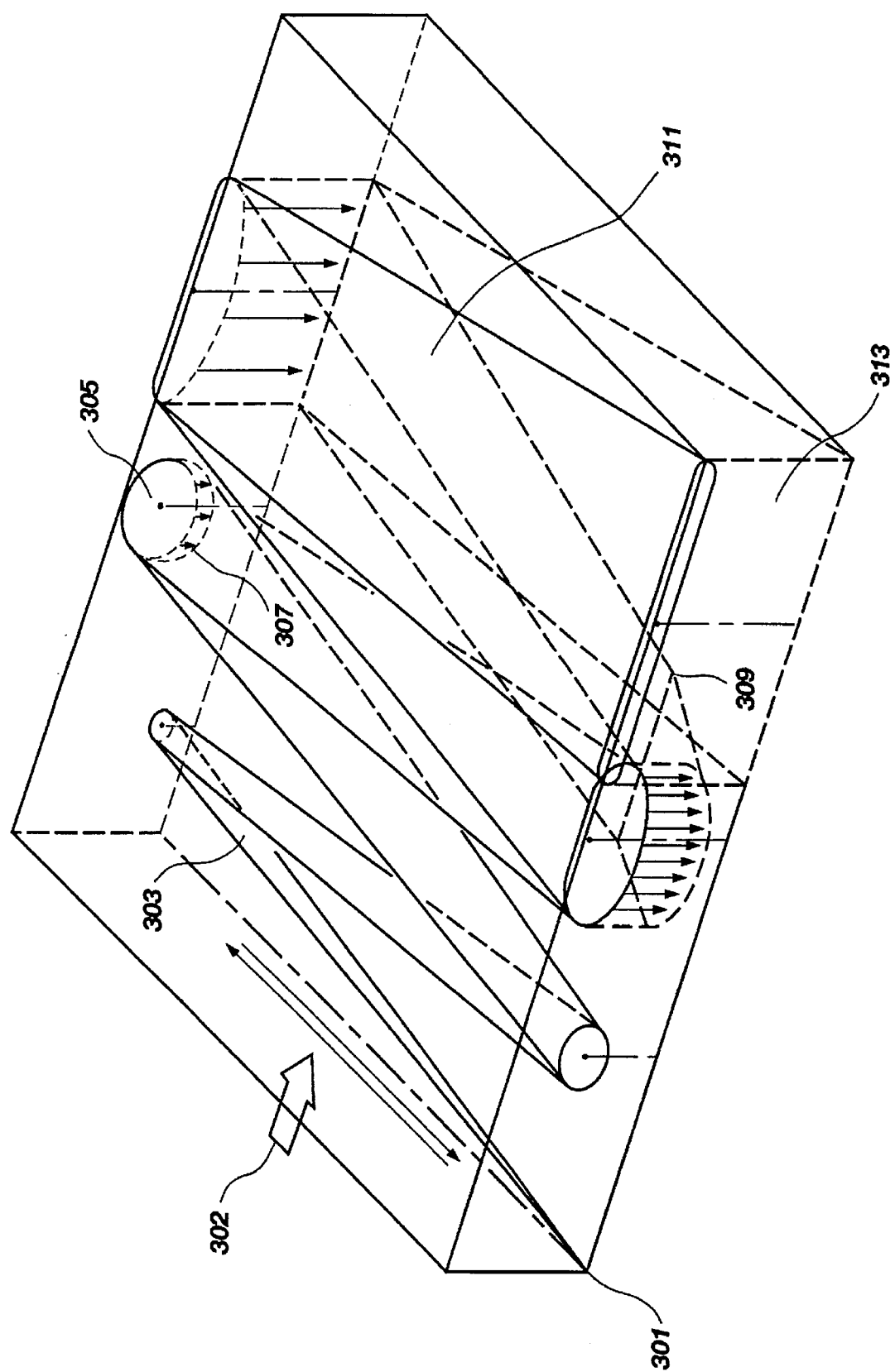
FIG. 3 is a 3-dimensional graph showing the microphysics-dynamics interaction in seeded fog according to the invention over time.

The seeding reaction involves initial lifting of an ice crystal plume during which the seeder/observer loses track of it. Referring to FIG. 3, which shows the evolution of the crystal plume over time. After the point of seeding 301, the cleared portion expanded and rose from the ground while drifting with the prevailing wind 302, (see points 303, 305). Ice crystals soon begin to fall 307, and their position separates from the rising warm air created by the heat of the phase change. When the ice crystals reach the ground, an optical effect becomes visible 309. For this reason, the time period to witness the effect is short, although the effect is important to confirm the artificial seeding of the fog. This ice crystal fallout and associated optical effect is followed by another period of clear space extension 311, 313 due to mixing of dry air space left behind the falling ice crystals, with fog. At about $-10°$ C., the ice crystal growth rate, an important factor for fog droplet evaporation and clearing, shows a minimum with a fall velocity maximum. In this temperature zone, the seeding efficiency is lower. The best efficiency occurs at about $-15°$ C., although the new method of seeding works under almost any temperature below $0°$ C. Clearing of supercooled fog for an area more than 100 $mi^2$ has already been demonstrated.

The depth of fog is another important factor for fog clearing. At a given temperature, the fog depth determines the time period of ice crystal plume rise, diffusion, and ice crystal growth. In this regard, the deeper and the denser the fog, the better and the larger the seeding effect is.

LC seeding rate is between about 0.2 and about 5 $lb/mi^2$, preferably about 1 $lb/mi^2$. In actual applications the seeding rate determined by experiment is usually about 1 $lb/mi^2$, although it varies depending on the fog condition. Clearing occurs on average up to about 1 mile normal to the direction of seeding.

The new horizontal line mobile ground seeding method of LC to control supercooled fog has evolved over the past several years, and the high efficiency of the seeding was confirmed by early airborne, penetration seeding of fog over the Great Salt Lake. Extensive tests of the ground seeding device were carried out on a semi-quantitative basis, and the results were remarkable.

The snow crystals accumulated after seeding are normally blown away by cars or evaporate by the sunshine introduced.

EXAMPLES

Comparative Example A

Three fog top seedings were carried out around the north shore area of Tooele Valley (Dec. 27, fog temperature; $-2°$—$6°$ C.) using an airplane equipped with a LC generator. Somewhat weak and short-lived optical effects were observed (a portion of sun pillar) followed by very weak trench formation. Apparently the formed ice crystals either did not spread due to the stability (warming) caused by seeding or sublimation loss due to mixing with dry warm air above. It was concluded that fog top seeding by skimming LC spraying aircraft is not an effective method.

Comparative Example B

A stationary liquid $CO_2$ (LC) generator was tested during a fog episode at the Murray City Golf Course site. While the generator was being operated at night, the area around the generator at the radial distance of about 1 mi (1.6 km) was observed, (12/16 and 12/17, fog temperature; $-5°$ and $-3.6°$ C., respectively). The visibility was less than 30 feet (10 m) in the unseeded fog but in the seeded zone filled with glittering crystals it was better than 2 blocks. When the wind reversed, we observed a snow shower which accumulated to ¼ inch (6 mm) in a matter of a few minutes. The spreading of seeded ice crystal plume was on the order of 1 mi in about 1 h. Directing of the cleared zone to the target area was the problem with this method.

Example

Apparatuses of the invention essentially as illustrated in FIG. 2 were built and used in the following tests. Two LC tanks made of aluminum with 50 lb (~23 kg) capacity were mounted in the tank rack in a tilted manner, with the valves at the lower side. Nozzles of 0.01 in (0.25 mm) diameter, with a discharging rate of about 2 g/s, were used (see Tables 1a and 1b). With the nozzle, the 50 lb LC tank lasts for about 2.5 h.

Ground Seeding Tests

Extensive supercooled fog seedings were carried out using the car-mounted LC seeding devices over strategic areas like downtowns of cities, dangerous areas of freeway and highway, airports and industrial plants. Seedability of fog was determined most conveniently by the formation of rime on trees, which is made of impacted and frozen fog droplets. Targeting of seeding effect under the prevailing fog drift was effectively carried out by circling around the target with sufficient distance while the LC generator was on. On one occasion, the entire Salt Lake Valley was seeded. Details of seeding experiments are as follows;

(1) Night Seeding in Orem

Temperature; 18° F. (−8° C.)
Seeding period; 2230–2400 MST, Dec. 3
Seeding location; From the north end of Provo valley on I-15 to Geneva Steel Co. and around Geneva twice.
Wind; calm
LC consumption; ~40 lb (~18 kg)
Area cleared; ~20 mi$^2$ (~50 km$^2$)
Observation and comments: Fog was filling Provo valley and seeding was carried out from Draper pass to Geneva Steel area. Fog depth was estimated as 125 m. Good light pillars were observed around Geneva Steel, and stars started showing as the visibility increased from about ¼ mi (400 m). Ice crystal plumes were warmer than the rest of the fog by about 1°~1.5° C.

Next morning, fog was totally cleared and calm around Geneva Steel at about 0915 MST.

(2) Orem Seeding

Temperature; −10° C.
Seeding period; 0653–0742, 0748–0845 MST, Dec. 5
Seeding location; circled around Geneva Steel, Orem
Wind; 1~2 m/s from west
LC consumption; ~40 lb (~18 kg)
Observation and comments: The length of seeding route in loop was 8.7 mi (14 km). No optical effect of seeding was observed, but ice crystals were seen on fresh tire marks. The fog depth was between 30 and 60 ft (10 and 20 m). Wind was blowing perpendicular to most of the seeding route. It appeared that due to −10° C. fog temperature which is the slow growth and fast falling zone of ice crystals and shallow fog, seeding effect was poor.

(3) Logan Seeding

Temperature; 16° F. (−9° C.)
Day; Dec. 23.
Initial visibility; ~¼ mi (~400 m)
Fog depth; ~1000 ft (~300 m)
Wind; calm
Seeding data and observation:

| | |
|---|---|
| Area A: | Logan downtown from 200N/Main to 1000N/Main; then from 1000 N/Main to 1000N/1000W; then from 1000N/1000W to 200N/1000W; and from 200N/1000W back to 200N/Main |
| Time: | 0737–0810 MST; this route was seeded twice during this period. During the second trip, an increase in visibility to 3/4 mi (1.2 km) was observed as was a significant amount of snow (1/8 in or 6 mm); 3 pictures taken at 400N/Main |
| Area B: | From 200N/Main to 2500N/Main to 2500N/900W (airport entrance) and an oval of the main runway and taxiways at the airport |
| Time: | 0810–0845 MST; 3 trips around the oval were made. Snow started falling 5 min after seeding started and was falling in significant amounts at the terminal at 0845 MST. By 0915 MST the reported visibility at Logan airport had improved to 1 mi (1.6 km) from the initial poor visibility of 1/4 mi (400 m). |
| Area C: | From 2500N/1000W to 200N/1000W to 200N/Main |
| Time: | 0845–0900 MST; significant amounts of snow were present on roads previously seeded, while roads not previously seeded were bare. |
| Area D: | From 200N/Main to 1000N/Main to 1000N/1000W to 200N/1000W to 200N/Main; pictures taken at 400 N/Main |
| Time: | 0915–0930 MST |
| Area E: | From 200N/Main to 2500N/Main to airport entrance |
| Time: | 0930–0945 MST; at this time a thin layer of snow coated completely the airport runway and taxiways. By 1045 MST, the visibility had deteriorated to 1/2 mi (800 m), two hours after seeding at the Logan airport had been terminated; pictures from airport. The visibility improvement at the airport was recorded by Weather Bank computer. There was a clearing at Logan Airport after seeding, with uneven fog remaining in the background. It is an indication for existence of convective cells in the fog. |

(4) Ensign Seeding

Temperature; 24.3°–26.8° F. (−4.3°—−2.9° C.) (a.m.), 22.9°–27.0° F. (−5.0°—−2.8° C.) (p.m.), 29.5°–32.0° F. (−1.4°–0° C., above fog) (p.m.)
Seeding period; 0855–1012 MST (a.m.), 1250–1347 MST (p.m.), Dec. 27.
Seeding location; side of Ensign Peak
Wind; westerly (a.m.), southerly (p.m.) 1~2 m/s
Area cleared; south of Ensign Peak (a.m.), north of Ensign Peak (p.m.)
Observation and comments: This seeding was carried out towards the end of a week-long fog episode in which the bottom of the fog was not reaching the ground in the city area, and therefore the fog was not seedable from the valley floor. The fog was just like a low stratus cloud, and it was apparently and partly due to salinity of the Great Salt Lake which tends to dry the air. By realizing that there exists a road by Ensign Peak which is higher than the fog base and having permission to use a 4-wheel drive car equipped with the seeding device, a seeding was carried out repeatedly (about 4 trips) on the road whose linear distance is only 1 mi (1.6 km). An optical effect (an undersun) in agreement with the growth habit of ice crystals at the temperature was seen. The westerly wind carried the seeding effect to the east and eventually to the south. After the seeding, the ground at around 931 E. Capitol Blvd. (behind the State Capitol) was observed totally covered with freshly fallen snow by about ⅛ in (3 mm). At that time, the fog was breaking open with a hazy sun shining through it. In the late morning hours, snowfall was observed at a few locations in downtown Salt Lake City. At around 1100 MST on the University of Utah campus, fog breaking with hazy sun started to show. In the breaking, the convective fog cells were clearly visible, giving a weird impression.

Afternoon seeding was also carried out on the same road. To our surprise, the wind was southerly in the afternoon. The seeding effect was this time carried to the north, and at one location in Bountiful, fog clearing was reported.

The meteorological data measured at the University of Utah revealed surprising but consistent data with the seeding in regard to the morning Ensign seeding effect. With the estimated speed of the wind, 1~2 m/s, at the seeding site along the Wasatch range and the distance between the seeding site and the university being about 4 km, the time required for the initial portion of the seeded plume to reach the university was estimated as about 1 h. Since the seeding started at 0855 MST, the time of the plume arrival at the university should have been at about 0955 MST.

Figure 4:
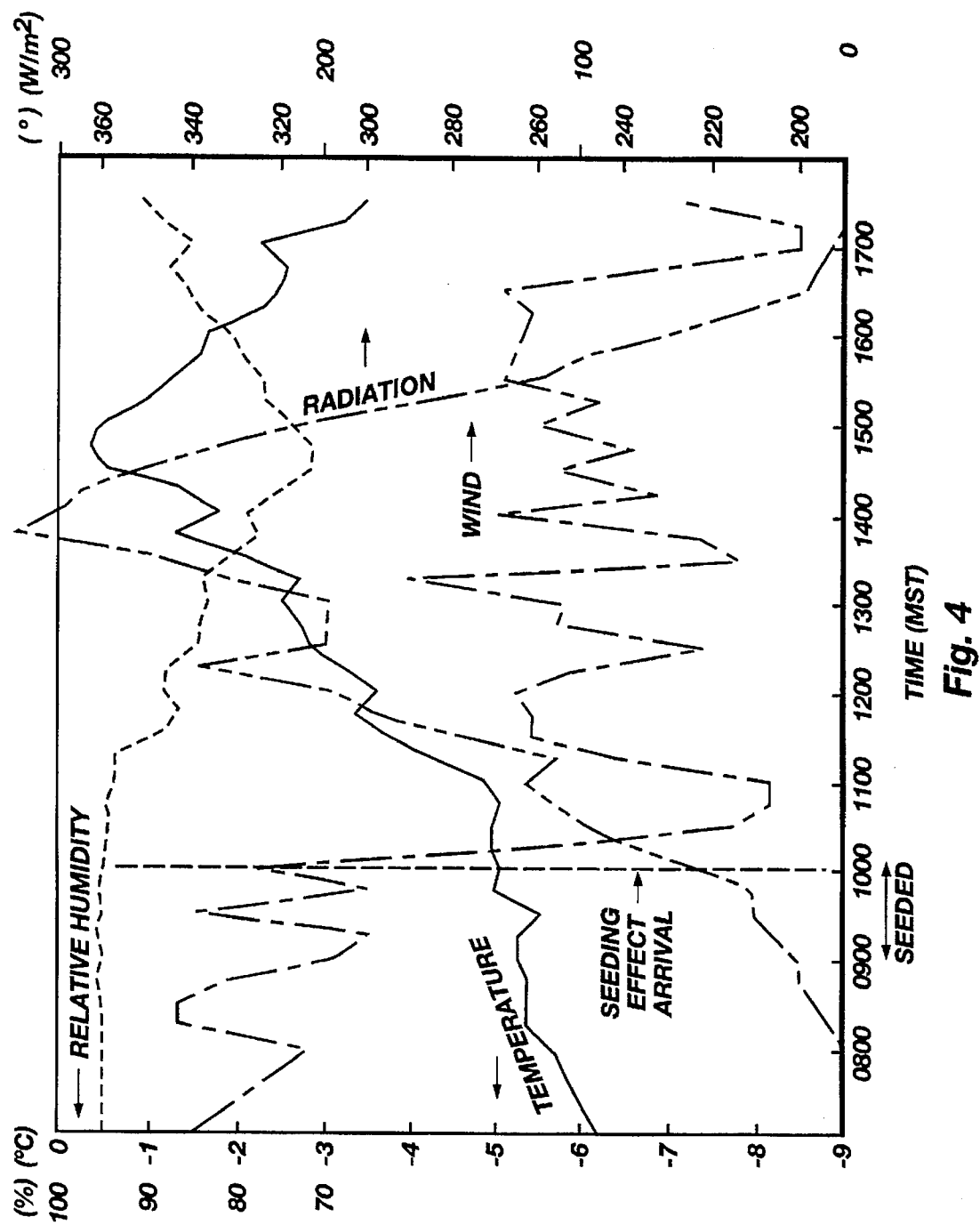
FIG. 4 is a composite graph showing various meteorological variables observed during a fog seeding experiment conducted according to the invention.

The meteorological conditions during this seeding test are summarized in FIG. 4. As can be seen in the figure, the temperature, wind direction, relative humidity and insolation (solar radiation) all began to show the changes about the time of seeding effect arrival. The most remarkable is the wind direction change from about 320°, or northwest, to about 240°, or southwest. This is equivalent to a 90° change. Whereas, the wind at the Salt Lake International Airport, which was out of range of the seeding effect, virtually remained southerly all day long. The wind, therefore, at the university in the early morning must have been a part of a gentle circulation parallel to the mountain range and caused by the prevailing southerly wind at the middle of the valley or at the airport. The southwesterly wind developed at about the time of the seeding effect arrival and was an upslope, local and, therefore, artificial wind. Under the existing large scale meteorological condition, this was possible only by local heating. The insolation increase and the associated temperature rise clearly and consistently support this view. The relative humidity decrease is also an indicator of fog clearing. The solar radiation appeared to have increased at least by a factor of 2.

The maximum clearing was several tens $mi^2$ (or about 150 $km^2$), which is considerably larger than the size of the seeded plume. Apparently the heating by solar radiation helped to enlarge the opening.

A possible mechanism of hole enlargement by artificially introduced solar radiation after seeding is a follows. The air heated by newly introduced solar radiation rises and hits the temperature inversion that exists above the fog. Since the air in the inversion is much warmer than the rising air, the latter simply pushes the fog layer below the inversion away from the mountain slope and makes the plume opening wider. Because the fog exists in the middle of the mixing zone, the pushing will also evaporate a part of the fog layer.

After the sun set, the fog came back.

(5a) Beck Street Area Seeding

Temperature; 20.6°–26.0° F. (–6.3—3.3° C.)
Seeding period; 0825–0920 MST, Dec. 28
Seeding location; Victory Rd.-Beck St.-Center St.-Redwood Rd.-I-15
Wind; calm
LC consumption; 20 lb (9 kg)
Area cleared; patchy cleared areas due to shallow fog
Observation and comments: Fog was light to moderate and shallow. Fallen snow was observed on ¼ mi (400 m) stretches of Redwood Rd. and North Salt lake.

(5b) 3500 S. Street Seeding

Temperature; –5° C.
Day; Dec. 28
Seeding location; 3500 South St. from Redwood Rd. to Oquirrh Mountains
Wind; south, 6 mph (about 3 m/s)
Observation and comments: Patchy morning fog. Minor traces of snow were observed occasionally along the seeded route and a large patch of blue sky developed on the north side of 3500 South St. after seeding.

(6a) Midvale Seeding

Temperature; –2°—4° C.
Seeding period; 1st Seeding, 2209–2238 MST; 2nd seeding, 2243–2310 MST, Dec. 29.
Seeding location;
   1st seeding, I-215 from Redwood Rd. to I-15, I-15 from I-215 to 9000 S., 9000 S. from I-15 to Redwood Rd., Redwood Rd. from 9000 S. to I-215.
   2nd seeding, 5300 S. from Redwood Rd. to I-15, I-15 from 5300 S. to 7200 S., 7200 S. from I-15 to Redwood Rd., Redwood Rd. from 7200 S. to 5300 S.
   3rd seeding, Valley Fair Mall area
Wind; north, 5 mph (2.2 m/s)
Visibility; 100 ft-¼ mi (30–400 m)
Observation and comments: Fog banks moved rather rapidly, causing the seeding car to weave in and out of both seeded plumes and dense fog patches. Light pillars were observed frequently in seeded plumes.

(6b) East Capitol Blvd, Seeding-1

Temperature; 27° F. (–2.7° C.)
Seeding period; 1620–1724 MST, Dec. 29
Seeding location; East Capitol Blvd.
Wind; 2–3 m/s
LC consumption; 15 lb (6.8 kg)
Observation and comments: Seeded ice crystal plumes were observed in patches but went away due to fast fog movement.

(6c) East Capitol Blvd. Seeding-2

Temperature; 29.0°–30.0° F. (–1.7°—1.1° C.)
Seeding period; 2000–2040 MST, Dec. 29
Seeding location; East Capitol Blvd.
Wind; light
LC consumption; 5 lb (2.3 kg)
Observation and comments: Ice crystal plumes were observed everywhere. Fog was totally cleared. At this warm temperature, no other method would have done the job.

(6d) West Jordan Seeding

Conditions are about the same as (6a), except the seeding location.
Seeding location; a circle surrounded by I215-I15-9000 S.-Redwood Rd.
Observation; about the same as (6a)

(7) Beck Street seeding

Temperature; 21.6°–25.6° F. (–5.8°—6.4° C.)
Seeding period; 2245–0017 MST, Jan. 4
Seeding location; area surrounded by Victory Rd.-Beck St.-Center St.-Redwood Rd.-North Temple St.
Wind; varied and slight
Visibility; ⅛ mi (200 m) or less
LC consumption; 30 lb (14 kg)
Area cleared; 20 $mi^2$ (50 $km^2$)
Observation and comments: Light pillars were seen on I-15 from Beck St. exit, showing signs of the freeway fog clearing. Clearing of the seeded area was almost perfect, but there appeared to be plume drifting away from the original areas of seeding.

(8a) State Capitol Seeding

Temperature; 21°–25° F. (–7.2°—3.9° C.)
Seeding period; 1945–2040 MST, Jan. 10
Seeding location; around the State Capitol, Victory Rd. and Beck St.
Wind; from State Capitol to Victory Rd.
Visibility; ¼ mi (400 m)
LC consumption; 15 lb (7 kg)
Area cleared; 10 $mi^2$ (25 $km^2$) area adjacent to Victory Rd. and Beck St.
Observation and comments: Due to the wind directed to Victory Rd. and Beck St. from the State Capitol area, the seeded ice crystal plumes were apparently blown to the former areas. Large ice crystals were observed floating in the Beck St. area with light streaks (seeding effect) from the street lights.

(8b) Salt Lake International Airport Seeding

Temperature; 17.8°–22.3° F. (–7.9°—–5.4° C.)
Seeding period; 2308–2358 MST, 0005–0040 MST, Jan. 10
Seeding location; 1st period, Salt Lake International Airport parking area, twice, then on N. Temple St. to Redwood Rd. 2nd period, on I-80 from the airport towards west to 7200 W. and reversed on I-80 to Redwood Rd.
Wind; southwesterly
Visibility; ⅛ mi (200 m) or less
LC consumption; 15 lb (6.8 kg)
Observation and comments: On the way to the airport on N. Temple St., ice crystal plume of operational dry ice seeding was observed in the eastern area of the airport parking. Airport parking area was very foggy and difficult to drive at the beginning. After seeding, it was cleared completely. Ice crystal plume generated later on I-80 to the west of the airport appeared to have drifted away by the southwesterly wind.

(8c) West Valley/Salt Lake Airport #2 Seeding

Temperature; –11°—–5° C.
Seeding period; 0730–1200 MST, Jan. 10.
Seeding location; West Valley City and Salt Lake Airport #2, Sandy
Wind; calm
Visibility; 100 ft–½ mi (30–800 m)
Observation and comments: The fog was extremely patchy. After seeding along Redwood Rd. and 3500 S., a very sharp sundog containing vivid colors was observed a few blocks south of 3500 S. Trees were seen excessively rimed in the Jordan River basin. However, trees above the river basin, an elevation of only about 10 m higher, had no rime.

(8d) Midvale Seeding

Temperature; –5.8°—–3.0° C.
Seeding period; 1930–2100 MST, Jan. 10
Seeding location; area surrounded by Redwood Rd., I-215, I-15, 9000 S. and that surrounded by 9000 S., 1300 W., 7000 S. and Redwood Rd.
Wind; light and variable with predominant northward drift
Visibility; 100 ft–¼ mi (30–400 m)
Observation and comments: The path described above was traversed 3 times while continuously seeding. Very heavy snowfall was observed during the second and third times through the route. However, these dense areas of snowfall were intermittent and not significantly present on I-15. Visibility improved to about ½–¾ mi (0.8–1.2 km), and on a few occasions small holes were observed through the fog, while looking up permitted the sighting of stars and the moon. In spite of the dense snowfall, very few light pillars were observed. The fog was densest near the Jordan River, suggesting that 1300 W. was a better road to seed than Redwood Rd. A policeman stopped and inquired what we were doing and was satisfied with our explanation. Upon our return to West Valley City, snow was observed falling as far north as 4800 S.

(9) Orem Seeding

Temperature; –11°—–9° C.
Seeding period; 0730–0930 MST, Jan. 19
Seeding location; around Geneva Steel and I-15 from American Fork to Spanish Fork
Wind; slight and variable
Visibility; 50 ft–1 mi (20–1,600 m)
Area cleared; about several tens square miles (~150 km$^2$)
Observation and comments: Although it was planned that the entire Provo-Orem area be seeded, only the low-lying areas of the two cities had dense fog. Therefore, the fog was seeded by four vehicles mainly by driving on I-15 between Spanish Fork and American Fork, with one of the four seeding vehicles dedicated to seeding around the Geneva Steel plant. Due to patchiness of the fog south of Orem, the section of I-15 from Orem to Spanish Fork was soon abandoned, and three vehicles concentrated on seeding the very dense fog from Orem to American Fork (visibilities often dropped below 50 ft or 20 m). Abundant ice crystal falls were observed and tire tracks on the highways were seen in the accumulating freshly fallen ice crystals. In addition, numerous and colorful sundogs were recorded photographically. Significant improvement in visibility was also observed in some of the seeded areas.

(10) Orem-Provo Seeding with Aerial Observation by Helicopter

Temperature; –13°—–11° C.
Seeding location; Provo-Orem area
Wind; light and variable, but a predominant northward drift was observed.
Day; Jan. 20
Visibility; 50 ft–¼ mi (15–400 m)
LC consumption; about 100 lb (45 kg)
Area cleared; several tens mi$^2$ (150 km$^2$)
Observation and comments: Due to delay of the Channel 5 television helicopter at Salt Lake International Airport, the very dense but probably shallow fog at the south end of the Salt Lake Valley was not seeded. By 0800 MST, it had begun to dissipate. The four seeding vehicles therefore proceeded to Provo-Orem area. Significant sundogs were observed near Geneva Steel prior to seeding. Four different paths were seeded in an effort to produce a striking seed pattern clearly visible from above in the helicopter. Seeding commenced at 0905 MST. One path completed the circuit around Geneva Steel. Another seeded a straight line from just east of Geneva to American Fork through very dense fog on I-15. The third seeded Geneva Road from Geneva Steel all the way down to Center St. in Provo. The fourth seeded an L-shaped path from Provo airport to Center St. then west to Utah Lake State Park. Sundogs were not abundantly observed from the ground, but large amounts of six-pointed, star-shaped crystals were observed at Utah Lake State Park. Also, about 30 min after seeding, a huge hole opened above Utah Lake State Park through which the helicopter flying above was recognized. This hole widened and extended northward. From the helicopter, clearing was seen all over in Orem city by 0940 MST, northeast of Geneva Steel. By 1030 MST, the hole enlarged to fill the entire northern portion of Utah Valley, and therefore, no fog was observed while the seeding team returned to Salt Lake City, even in areas where the visibility had been less than 50 ft (15 m).

(11) Valley-wide Seeding, Salt Lake City

Temperature; –10°—–8° C.
Seeding period; 0800–1100 MST, Jan. 21
Seeding location; Salt Lake City
Wind; calm, with slight drift from south to north
Visibility; ⅛–1 mi (200–1,600 m)

LC consumption; 300 lb (136 kg)

Observations and comments: Four seeding vehicles met at 7200 South and I-15. As two left the 3911 S. 2475 W. at 0715 MST, significant snow was observed falling and ¼ in (6 mm) had accumulated on the ground prior to any seeding (seeding generators were not turned until all vehicles arrived at 7200 South and I-15). The visibility enroute was ⅛–1 mi (200–1,600 m), not nearly as dense as that encountered the previous day in Provo-Orem. The densest fog was observed in the Jordan River bottom. At 0845 MST, a little fog was observed at the mouth of Little Cottonwood Canyon. Snow was observed on the ground in many areas which had not been seeded, and in addition, heavily rimed trees were frequently observed throughout the Salt Lake Valley. None were as heavily rimed as those observed at Utah Lake State Park in Provo the preceding day.

Due to much thinner fog west of 4000 W. at 7800 S., the four seeding routes were initiated at 4000 W. instead of 9000 W. near Copperton. From there, the four seeding vehicles proceeded on their preassigned seeding routes for the next three hours. The dramatic increases in visibility were not observed as was the case in Provo-Orem at (10). One explanation was that the crystals falling out of the fog after seeding were different from those observed falling from the Provo fog. Those falling from the Provo fog were 3–5 mm and a simple six-pointed star in habit, while those falling from the Salt Lake fog were 0.5 mm in size and isometric. The different temperatures ($-13°$—$11°$ C. in then Provo, and $-10°$—$8°$ C. here in Salt Lake) account for the differences in the types of ice crystals falling out of the fog and therefore for the differences in the observed effects of seeding.

At the University of Utah, the visibility was about ¼ mi (400 m) at 0800 MST. At 0945, breaking of fog with appearance of sun was observed. The broken fog showed cellular structure, giving an impression of cumulus cloud. The opening was closed at around noon but by about 1400 MST, the sky totally opened up. The meteorological condition was in favor of fog clearing, but it appeared that seeding made it happen earlier than without it.

(12) Northern Salt Lake City Seeding

Temperature; $-13.5°$—$7.6°$ C.
Seeding period; 0827–1014 MST, Jan. 22
Seeding location; north end of Salt Lake Valley
Wind; variable, but predominantly southerly
Visibility; 100 ft to ¾ mi (30–1,200 m)
Observation and comments: After the seeding, fog cleared, but due to widespread seeding, the frequency of encountering the optical effect was not high. As a result, it was not certain if the clearing was entirely due to the seeding or natural change.

(13) Beck Street Seeding

Temperature; 20.7°–28.8° F. ($-6.3°$—$1.8°$ C.)
Seeding period; 0716–0735 MST, Jan. 25
Seeding location; Beck Street
Wind; calm
Visibility; ⅛–¼ mi (200–400 m)
LC consumption; 7 lb (3 kg)
Observation and comments: Clearing was observed as usual.

(14) Beck Street Seeding

Temperature; $-7°$ C.
Seeding period; 0730–0800 MST, Jan. 28.
Seeding location; I-215 from 700 N. to Redwood Rd.
Wind; calm
Visibility; 100 ft–¼ mi (30–400 m)
LC consumption; 10 lb (4.5 kg)
Observation and comments: The fog was only 50–100 ft (15–30 m) thick but was continuous from 700 N. to Redwood Rd. The I-215/I-15 interchange, which was reported to be very foggy, had very little fog. By the time seeding had been completed on a trip north on I-215 and the return south to the 700 N. exit, the previously very dense fog was rapidly dissipating. No optical effect was observed, but there were traces of snow on the interstate. Although the seeded area cleared rapidly, the unseeded area to the south and west (Salt Lake International Airport) of the seeded area remained foggy.

(15a) Beck Street Area Seeding, Morning—I

Temperature; $-6°$—$3°$ C.
Seeding period; 0740–0925 MST (Car A), 0700–0945 MST, Jan. 29
Seeding location; Car A seeded in the north, Car B from 2100 S. northward on I-215, N. Temple, State St., and then State St.
Visibility; 0–¼ mi (0–400 m)
LC consumption; 20 lb (9 kg, Car A), 35 lb (16 kg, Car B)
Area cleared; 40 mi$^2$ (100 km$^2$)
Observation and comments: Fog was extremely dense and mobile. When the previously seeded route was observed, often the fog was as dense as before, indicating the mobility of the fog. However, seeding effects became very clear initially, with abundant snow cover on the road, and then improved visibility. By 0930 MST, the dense fog had been dispersed and a thick haze was all that remained. Crystals were small.

(15b) Beck Street Area Seeding, Morning—II

Temperature; 27.5° F. ($-2.5°$ C.)
Seeding period; 1900–2125 MST (2 cars), Jan. 29
Seeding location; N. Temple-300 W.-Beck St.-Center St.-Redwood Rd. (2 cars)
Wind; calm with some drifts
Visibility; ¼ mi (400 m)
LC consumption; 60 lb (27 kg) in total
Observation and comments: Snow cover on the road, which tended to blow away, and good clearing by the end of seeding were observed. The Salt lake International Airport area was also seeded. Light pillars were seen in the parking area.

(16a) Victory Rd.-Beck St., Early Morning Seeding

Temperature; 21° F. ($-6.1°$ C.)
Seeding period; 0540–0600 MST, Jan. 30
Seeding location; Victory Rd.-Beck St.
Wind; calm
Visibility; less than ¼ mi (400 m)
LC consumption; 10 lb (4.5 kg)
Observation and comments: Thick fog staying in the Victory Rd.-Beck St. area was totally cleared shortly after the end of seeding.

(16b) Salt Lake International Airport Seeding

Temperature; $-6°$ C.
Seeding period; 0810–0900 MST (Car A), 0800–0930 MST (Car B), Jan. 30
Seeding location; Salt Lake International Airport with 2 cars.
Visibility; 0–1/16 mi (0–100 m)

LC consumption; 7.6 kg (Car A), 13.6 kg (Car B)

Observation and comments: At 0600 MST, the airport had reported zero visibility. Fog condition was initially assessed as very dense without LC seeding. The airport area was already being seeded with dry ice by operational aircraft. A large hole was opened in the very dense fog by the dry ice seeding, but the hole was east of I-215 instead of over the runway at the airport. Car A seeded the parking-terminal area, and Car B seeded along the west boundary of the airport south of the landing strip. After 1 hour of seeding in the extremely dense fog, colorful sundogs with fog breaking began appearing everywhere. By 0930 MST, huge patches of blue sky became visible and the fog was clearly dissipating rapidly. At 1000 MST, the visibility reached ¾ mi (1200 m) and by 1100 MST, 1-¼ mi (2,400 m) and thereafter unlimited. Just south of the airport on 4000 W. (upwind side), the visibility in the unseeded fog was ⅛ mi (200 m) at 1015 MST. In addition to causing smaller numbers of larger ice crystals in seeding, the advantage of LC ground seeding method, from the strategic advantage of placing the seeding material precisely in the upwind position, is apparent.

(17) Northeastern Salt Lake Valley Seeding

Temperature; 20.7°–23.8° F. (–6.3°—4.6° C.)
Seeding period; 0840–1015 MST, Jan. 31
Seeding location; northeastern Salt Lake Valley (3 cars)- 1300 S., 2100 S., and 2700 S. from Redwood Rd. to 1300 E.
Wind; light from the south
Visibility; ¼–¾ mi (400–1,200 m)
Observation and comments: Seeding effects were recorded with a time lapse movie camera at the second microwave station in the Ensign Peak area. By 0930 MST, holes were opening in the fog and large patches of blue sky appeared. However, no noticeable optical effects of ice crystals falling were observed. At the camera site, little change was observed even though the visibility had increased to 1–2 mi (1.6–3.2 km) in the seeded area. Apparently, the camera site was still not high enough that the accumulated haze in the optical (viewing) path prevented recognition of the holes created by seeding.

At 1005 MST, visibility on unseeded I-215 at Redwood Rd. was ¼ mi (400 m), although that in the seeded fog just a few blocks away was 1–2 mi (1.6–3.2 km).

(18) Beck Street Seeding

Temperature; 20°–29° F. (–6.7°—1.7° C.)
Seeding period; 0802–0954 MST, Feb. 1
Seeding location; Victory Rd.-Beck St.-Center St.-Redwood Rd.-N. Temple
Wind; calm
Visibility; ¼ mi (400 m)
LC consumption; 30 lb (13.6 kg)
Observation and comments: Time lapse movie and video cameras were set below 1st microwave station in Ensign Peak area. By 0830 MST, sun filtered through and patches of fresh snow cover were seen with depth 3–5 min. Area clearing became visible by 0858 MST and blue sky was recognized on Victory Rd. The seeded area entirely turned into haze with visibility far better than before. Time lapse movie and video did not reveal clearing, apparently indicating that the nearly horizontal viewing angle does not serve the purpose of revealing the seeding effect.

(19) Ensign Seeding

Temperature; 22.5°–27.7° F. (–5.3°—2.4° C.)
Seeding period; 1004–1106 MST, Feb. 2
Seeding area; 5 round-trip seedings on the road by Ensign Peak
Wind; northerly
Visibility; ¼ mi (400 m)
LC consumption; 20 lb (9 kg)
Area cleared; University of Utah area
Observation and comments: The bottom-lifted fog seeded at the side of Ensign Peak was similar to that of (4). After seeding, observation by driving a car through the area the seeding effect drifted indicated that the sky over the University of Utah area east of State St. was bluest.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A method for the reduction of supercooled fog that is restrained below an inversion layer, said method comprising (1) introducing liquid carbon dioxide through a nozzle into a supercooled fog from the ground while moving the nozzle along a line along the ground, the amount of liquid carbon dioxide introduced into the supercooled fog being sufficient to form ice crystals due to evaporation of supercooled fog droplets and subsequent formation of ice crystals;

(2) generating sufficient heat from the formation of ice crystals to cause a slowly rising updraft that carries the ice crystals in a slowly rising plume from the bottom to the top of the supercooled fog;

(3) diffusing and spreading the ice crystals horizontally near the top of the supercooled fog as a result of turbulent diffusion and buoyancy of the ice crystal plume at the bottom of the inversion layer;

(4) gradually increasing the size of the ice crystals as they rise and diffuse into the supercooled fog such that the ice crystals fall through the underlying fog in a lateral extension of the plume formed in step (1);

(5) inducing evaporation of supercooled fog droplets and crystallization of the evaporated fog droplets onto the ice crystals falling through the supercooled fog in the lateral extension, wherein additional heat is generated and causes a slowly rising updraft that is sufficient to carry the smaller ice crystals upwardly to the top of the supercooled fog;

(6) spreading the smaller ice crystals horizontally near the top of the supercooled fog as a result of the buoyancy of the smaller ice crystals;

(7) gradually increasing the size of the smaller ice crystals as they spread horizontally such that resulting ice crystals of increased size fall through the underlying supercooled fog in an ever expanding lateral extension of the plume formed in step (1).

2. The method of claim 1, wherein the liquid carbon dioxide is introduced into the supercooled fog at a rate of at least about 0.2 pounds per mile along the direction of the movement of the nozzle along the ground.

3. The method of claim 2 wherein the liquid carbon dioxide is introduced into the supercooled fog at a rate of between about 0.2 and 5 pounds per mile along the direction of the movement of the nozzle along the ground.

4. The method of claim 1 wherein the nozzle has a diameter of between about 0.006 and 0.01 inches.

* * * * *